March 27, 1962  J. J. JOHNSON  3,026,747
DEVICE FOR REFORMING DIAMOND SAW BLADES
Filed Aug. 3, 1961  2 Sheets-Sheet 1

INVENTOR.
JOHN J. JOHNSON
BY
Merchant, Merchant & Gould
ATTORNEYS

March 27, 1962  J. J. JOHNSON  3,026,747
DEVICE FOR REFORMING DIAMOND SAW BLADES
Filed Aug. 3, 1961  2 Sheets-Sheet 2
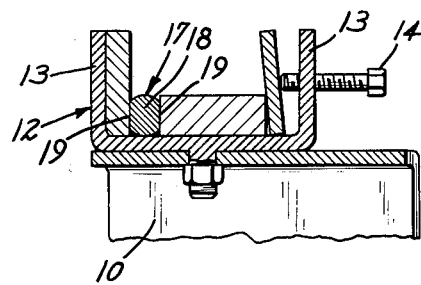
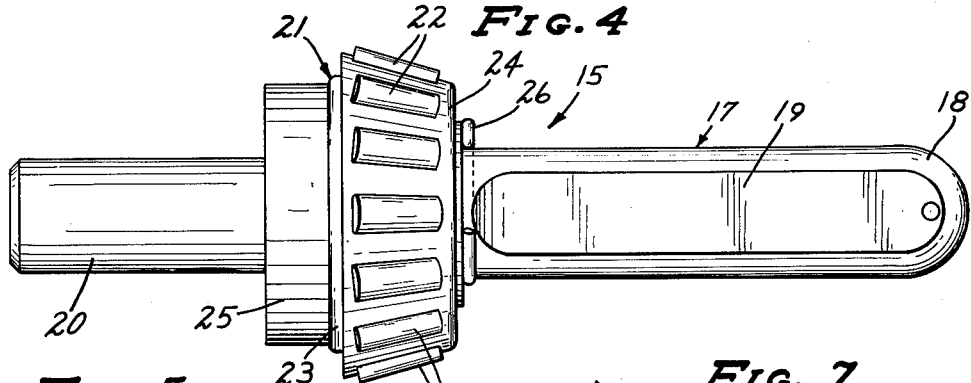
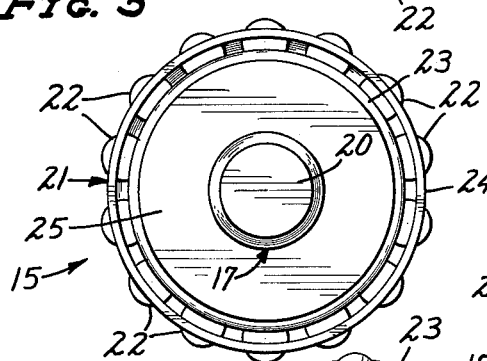
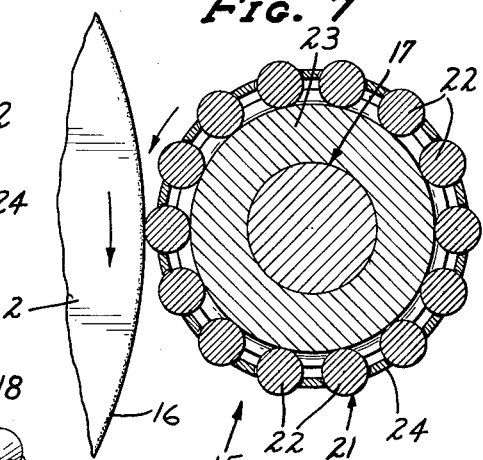
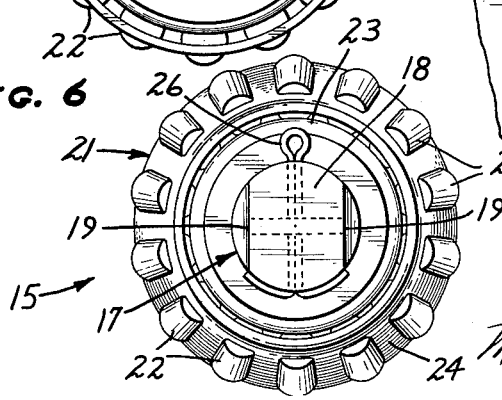
INVENTOR:
JOHN J. JOHNSON
BY
ATTORNEYS United States Patent Office 3,026,747
Patented Mar. 27, 1962

3,026,747
DEVICE FOR REFORMING DIAMOND
SAW BLADES
John J. Johnson, Baker, Mont.
Filed Aug. 3, 1961, Ser. No. 129,065
4 Claims. (Cl. 76—25)

This invention relates generally to devices for sharpening and setting saw blades, and more particularly it relates to a device for reforming diamond saw blades.

Diamond saws of the type commonly used in cutting stone and other similar hard material usually employ a diamond saw blade having a generally cylindrical peripheral edge surface. It is well known that when such saw blades are used for an extended period the cutting edge of the saw blade becomes worn to a sharp generally knife-like edge so that the saw begins to stick and run hot in the cutting groove in the stone. Therefore, it becomes necessary to dress the saw blades so as to reform the same with a generally cylindrical peripheral edge surface, and it has generally been the practice in doing so to use a carborundum stone or the like. However, when carborundum is used for reforming the peripheral edges of diamond saw blades, the procedure wears away a relatively large quantity of the metal from the saw blade, particularly the diamond chip particles embedded in the peripheral edge portion of the blade. Obviously, such practice greatly shortens the life of the relatively expensive diamond blades. In light of the above noted problems, it is an important object of this invention to provide a device for reforming a generally cylindrical peripheral edge surface on a diamond saw blade, which does so without wearing away the important diamond material embedded in the periphery of the saw blade.

Another object of this invention is to provide a device for reforming diamond saw blades which is constructed and arranged so as to be adjustable and effective with respect to saw blades of varying diameters.

Another object of this invention is the provision of a device for reforming diamond saw blades which may be easily and quickly secured in its operative position on the vice carriage of a lapidary table without removing the saw blade from its mounting.

Other objects of this invention reside in the provision of a device for reforming diamond saw blades which is strong and durable in construction, which provides a convenient assembly and therefore permits economical production, and which is highly efficient in providing satisfactory performance of its objects and purposes.

The above and still further objects of this invention will become apparent from the following detailed specification, appended claims and attached drawings.

Referring to the drawings, wherein like reference characters indicate like parts or elements throughout the several views:

FIG. 3 is an enlarged view in vertical section taken on the line 3—3 of FIG. 1;

FIG. 4 is an enlarged view in elevation of the roller bearing assembly of this invention;

FIG. 5 is a view in end elevation as seen from left to right of FIG. 4;

FIG. 6 is a view in end elevation as seen from right to left of FIG. 4; and

FIG. 7 is an enlarged view in vertical section taken on the line 7—7 of FIG. 1.

Figure 1:
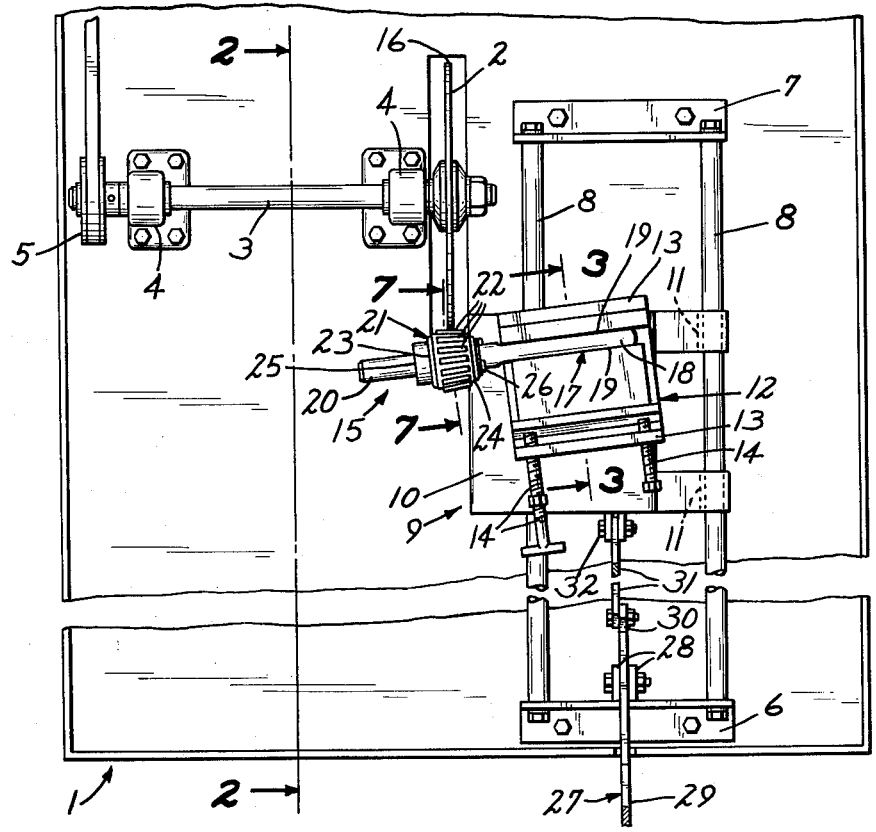
FIG. 1 is a view in top plan showing my invention in its operative position adjacent the saw blade of a conventional lapidary table, some parts being broken away.
Figure 2:
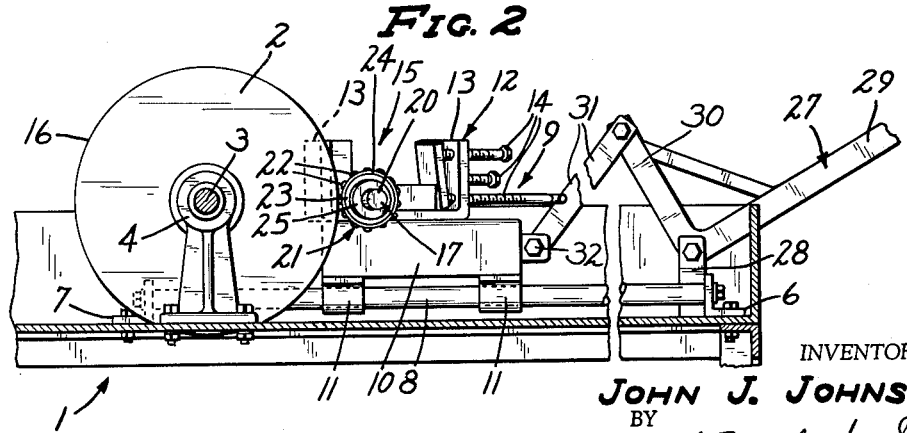
FIG. 2 is a view in vertical section taken on the line 2—2 of FIG. 1.

Referring to the drawings, and particularly FIGS. 1 and 2 thereof, a lapidary table is represented generally by the reference numeral 1. The diamond saw blade 2 is removably secured to an elongated shaft 3 which is mounted within a pair of axially spaced upstanding bearing blocks 4. As shown in FIG. 1, the other end of the shaft 3 is provided with a pulley 5 which is connected to suitable power means, not shown. Also, a pair of spaced angle brackets 6, 7 are rigidly secured to the lapidary table 1, and a pair of generally parallel generally cylindrical elongated guide rods 8 are secured intermediate the angle brackets 6, 7. A carriage structure, represented generally by the reference numeral 9, is mounted for sliding reciprocating movements on the guide rods 8, said movement being imparted by actuating means, which will be particularly described hereinafter. The carriage structure 9 includes a base portion 10 and a plurality of depending tubular feet 11, aligned pairs of which are received on the guide rods 8, as shown particularly in FIGS. 1 and 2. Rigidly secured to the base portion 10 of the carriage structure 9 is a stone vice 12 which comprises spaced jaws 13, one of which is provided with a pair of adjustable set screws 14 for rigidly securing various size articles within the vice 12.

In accordance with my invention, a roller bearing assembly, represented generally by the reference numeral 15, is provided for reforming the generally cylindrical peripheral edge surface 16 of the saw blade 2. The roller bearing assembly 15 comprises an elongated shaft portion 17 one end 18 of which defines opposite generally parallel flat surfaces 19, the opposite end 20 of the elongated shaft portion 17 being free. The opposite flat surfaces 19 of the elongated shaft portion 17 are provided so that the roller bearing assembly 15 may be rigidly secured within the jaws 13 of the vice 12, in a manner which will be hereinafter described. The roller bearing assembly 15 further comprises a bearing portion 21 disposed generally intermediate the opposite ends 18, 20 of the elongated shaft portion 17. The bearing portion 21 is equipped with a plurality of roller bearings 22 the respective axes of which form a frusto-conical arrangement as shown particularly in FIGS. 4 and 6. The bearing portion 21 of the roller bearing assembly 15 is generally conventional in form, the same including an inner race 23, and an annular retaining ring 24 which retains and disposes the roller bearings 22 for individual rotary movement of each thereof about its own axis and for rotary movement of all thereof about the axis of the elongated shaft portion 17. The bearing portion 21 of the roller bearing assembly 15 is positioned against an enlarged collar portion 25 and retained thereagainst to prevent axial movement thereof by means of a suitably positioned cotter pin 26.

Referring again to FIGS. 1 and 2, actuating means is shown for imparting reciprocating sliding movements to the vice held roller bearing assembly 15. Said actuating means comprises a bell crank 27 pivotally secured to a pair of journal lugs 28 disposed on the angle bracket 6. The bell crank 27 includes a handle forming long arm 29 and a short arm 30 which is pivotally secured to a connecting link 31, the latter being pivotally secured, as at 32, to the carriage structure 9.

Having specifically described this invention, the operative simplicity thereof will be briefly outlined. When the roller bearing assembly 15 is positioned within the vice 12 in a manner shown particularly in FIGS. 1–3, the same is thereby mounted and guided for reciprocating sliding movements in a direction extending generally parallel with the plane of the saw blade 2 and generally normal to the axis of the saw blade 2. The roller bearing assembly 15 is positioned within the vice 2 with a predetermined portion of the bearing portion 21 thereof in abutment with the peripheral edge surface 16 of the saw blade 2, this position being determined by a comparison of the particular diameter of the saw blade 2 with the adjacent diameter of the roller bearing assembly 15. That is, when a relatively large saw blade is to be reformed, the portion of the bearing portion 21 of the roller bearing assembly adjacent the free end 20 thereof is positioned against the peripheral edge 16 of the saw blade 2, and when a saw blade of a relatively small diameter is to be reformed, the portion of the roller bearing assembly adjacent the end 18 thereof is positioned adjacent the peripheral edge surface 16 of the saw blade 2. After the roller bearing assembly 15 is properly and securely positioned within the vice 12 of the carriage structure 9, the long arm 29 of the bell crank 27 is engaged and moved so as to impart reciprocating sliding movements to the vice held bearing assembly 15, sufficient pressure being exerted so that the roller bearings 22 of the roller bearing assembly 15 are caused to rotate in the above described manner. Thereupon, the roller bearings 22 one each successively engage the peripheral edge of the saw blade 2 so as to re-roll or reform a peripheral generally cylindrical edge surface 16 on the saw blade 2.

This invention has been thoroughly tested and found to be completely satisfactory for the accomplishment of the above objects; and while I have shown and described a preferred embodiment in which the principals of the present invention have been incorporated, I wish it to be specifically understood that the same may be modified without departure from the scope and spirit of the appended claims.

What I claim is:

1. In a device for reforming diamond saw blades, bearing means mounting said saw blade for rotary movement, a roller bearing assembly disposed adjacent the peripheral edge of said saw blade and having a plurality of circumferentially spaced roller bearings which are disposed for individual rotary movement of each thereof about its own axis and for rotary movement of all thereof about a central axis, means mounting said roller bearing assembly for reciprocating movements in a direction extending generally parallel with the plane of the saw blade and generally normal to the axis of the saw blade and power means for imparting rotary movement to said saw blade, whereby upon movement of the bearing assembly toward said saw blade and upon rotation of the saw blade, the roller bearings of said bearing assembly one each successively engage the peripheral edge of said saw blade to impart said rotary movement to said roller bearings and to roll a peripheral generally cylindrical edge surface on said saw blade.

2. In a device for reforming diamond saw blades, bearing means mounting said saw blade for rotary movement, a conical roller bearing assembly disposed adjacent the peripheral edge of said saw blade and having a plurality of circumferentially spaced roller bearings the respective axes of which form a frusto-conical arrangement, said roller bearings being retained and disposed for individual rotary movement of each thereof about its own axis and for rotary movement of all thereof about a central axis, means mounting said roller bearing assembly for reciprocating movements in a direction extending generally parallel with the plane of the saw blade and generally normal to the axis of the saw blade, and power means for imparting rotary movement to the saw blade, whereby upon movement of the bearing assembly toward said saw blade and upon rotation of the saw blade, the roller bearings of said bearing assembly one each successively engage the peripheral edge of said saw blade to impart said rotary movement to the roller bearings and to roll a peripheral generally cylindrical edge surface on said saw blade.

3. In a device for reforming diamond saw blades, bearing means mounting said saw blade for rotary movement, a conical roller bearing assembly disposed adjacent the peripheral edge of said saw blade, said bearing assembly comprising an elongated shaft portion and a bearing portion having a plurality of circumferentially spaced roller bearings the respective axes of which form a frusto-conical arrangement, said roller bearings being retained and disposed for individual rotary movement of each thereof about its own axis and for rotary movement of all thereof about the axis of said shaft portion, means mounting said shaft portion of said roller bearing assembly for reciprocating movements of the roller bearing assembly in a direction extending generally parallel with the plane of the saw blade and generally normal to the axis of the saw blade, and power means for imparting rotary movement to said saw blade, whereby upon movement of the bearing assembly toward said saw blade and upon rotation of the saw blade, the roller bearings of the bearing assembly one each successively engage the peripheral edge of said saw balde to impart said rotary movement to said roller bearings and to roll a peripheral generally cylindrical edge surface on the saw blade.

4. In a device for reforming diamond saw blades, bearing means mounting said saw blade for rotary movement, a conical roller bearing assembly disposed adjacent the peripheral edge of said saw blade, said bearing assembly comprising an elongated shaft portion and a bearing portion having a plurality of roller bearings the respective axes of which form a frusto-conical arrangement, said roller bearings being retained and disposed for individual rotary movement of each thereof about its own axes and for rotary movement of all thereof about the axis of said shaft portion, mounting means for said roller bearing assembly comprising a vice for gripping the shaft portion of said bearing assembly, means mounting and guiding said vice for reciprocating sliding movements in a direction extending generally parallel with the plane of the saw blade and generally normal to the axis of the saw blade, and actuating means for imparting said reciprocating sliding movements to said vice held bearing assembly, and said device for reforming diamond saw blades further comprising power means for imparting rotary movement to said saw blade, whereby upon movement of the bearing assembly toward said saw blade by said actuating means and upon rotation of the saw blade, the roller bearings of said bearing assembly one each successively engage the peripheral edge of said saw blade to impart said rotary movement to the roller bearings and to roll a peripheral generaly cylindrical edge surface on the saw blade.

References Cited in the file of this patent

UNITED STATES PATENTS

| | | |
|---|---|---|
| 622,987 | Wagner | Apr. 11, 1899 |
| 989,727 | Sage | Apr. 18, 1911 |
| 1,010,127 | Dingley | Nov. 28, 1911 |
| 1,805,955 | Player et al. | May 19, 1931 |
| 2,802,378 | Roberts | Aug. 13, 1957 |

FOREIGN PATENTS

| | | |
|---|---|---|
| 121,744 | Switzerland | July 16, 1927 |